Jan. 27, 1959   W. F. HESS   2,870,598
CHAIN HAVING A ONE PIECE FOLDED TUBULAR LINK
Filed Sept. 23, 1953

INVENTOR
William F. Hess
BY Nathaniel Frucht
ATTORNEY

United States Patent Office 2,870,598
Patented Jan. 27, 1959

2,870,598

CHAIN HAVING A ONE PIECE FOLDED TUBULAR LINK

William F. Hess, Providence, R. I.

Application September 23, 1953, Serial No. 381,922

2 Claims. (Cl. 59—80)

The present invention relates to the manufacture of ornamental chains, and has particular reference to a novel flexible chain construction suitable for automatic machine manufacture and assembly.

The principal object of the invention is to provide a novel construction for an ornamental flexible chain.

Another object of the invention is to provide an ornamental flexible chain made of links having independent connecting elements secured to the links without use of soldering or any fastening means extraneous to themselves.

A further object of the invention is to provide an ornamental flexible chain having independent connecting elements which automatically center and align the links.

An additional object of the invention is to provide an ornamental flexible chain in which the connecting elements securely lock the links together to impart great strength and resistance to link separation.

With the above and other objects and advantageous features in view, the invention consists of a novel arrangement of parts more fully disclosed in the detailed description following, in conjunction with the accompanying drawings, and more specifically defined in the claims appended thereto.

Figure 1:
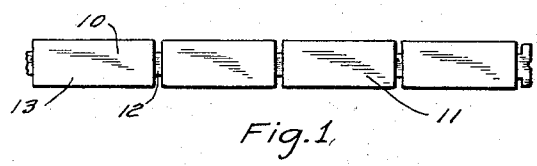
Fig. 1 is a top plan view of an illustrative assembled chain embodying the invention.
Figure 2:
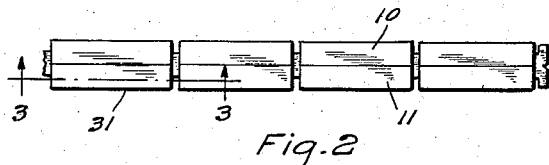
Fig. 2 is a bottom plan view thereof.
Figure 3:
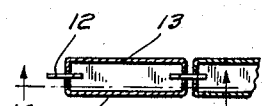
Fig. 3 is a vertical section on the line 3—3 of Fig. 2.

It has been found desirable to form an ornamental flexible chain of box type links which are flexibly linked together, the links being stamped and folded and having independent connecting elements which are secured in position within the ends of adjoining links by end lock tabs integral with the links, the connecting elements being shaped to align the links linearly while providing substantial flexibility. To this end, I form a link blank which can be struck up and bent to provide a box link with integral centering lock tabs at both ends, and an independent connecting element with end keys which are received within the box link ends of adjoining links to flexibly and securely hold the links together into an assembled chain, the parts being arranged to provide an extremely strong resistance to separating strains.

Referring to the drawings, the ornamental chain 10 is made up of a number of links 11 flexibly joined together by independent connecting elements 12, the links being preferably of the hollow box type with ornamental tops 13 which may be polished or decorated as desired.

Figure 8:
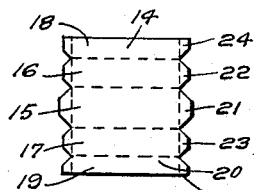
Fig. 8 is a plan view of a link blank.

Each link is formed from a blank 14, see Fig. 8, which has a base 15, sides 16, 17 and wings 18, 19 of the same width, the link blank being grooved as indicated at 20 to facilitate bending. The base, the sides and the wings each respectively have end tabs 21, 22, 23, 24, which have inwardly tapering sides, the base end tabs 21 being of greater height than the side and wing end tabs.

Figure 4:
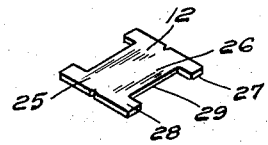
Fig. 4 is an enlarged perspective view of a link connecting element.

Each connecting element 12 is formed from a blank 25, see Fig. 4, with a transverse web 26 and lateral key portions 27, 28 at each end, whereby side recesses 29 are provided.

Figure 9:
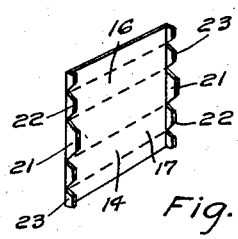
Fig. 9 is a perspective view of the link blank with its end tabs bent up.
Figure 10:
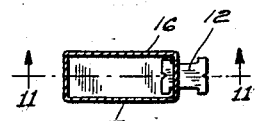
Fig. 10 is a section on the line 10—10 of Fig. 3.
Figure 11:
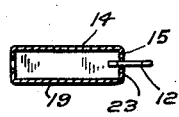
Fig. 11 is a section on the line 11—11 of Fig. 10.
Figure 12:
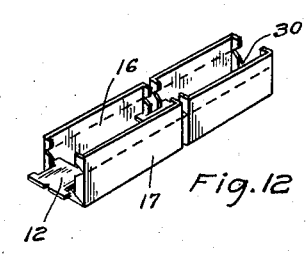
Fig. 12 is a perspective view showing the assembly connection for two links.
Figure 13:
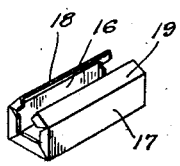
Fig. 13 is a perspective view of one link showing the top wings partially folded.

The blank 14 being struck out, the tabs 21, 22, and 23 and then the sides 16, 17 are bent up, see Figs. 9 and 12, to provide a recessed seat 30 for receiving the connecting element 12, which is positioned with its transverse web 26 resting on the base tab 21 and the keys 27 at one end secured behind the side end tabs 16, 17 of the links, as illustrated in Fig. 10, with the side recesses 29 receiving the end tabs. The wings 18, 19 are then folded over, see Fig. 13, to form the link bottom 31 and the links successively assembled together, the connecting elements being thus locked in place to hold the links together and complete the assembly. Thus, the chain is formed of assembled links with the connecting elements locked behind sturdy side end tabs and flexibly securing adjoining links in alignment.

Figure 5:
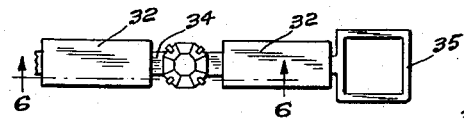
Fig. 5 is a top plan view of an assembled modified chain construction.
Figure 6:
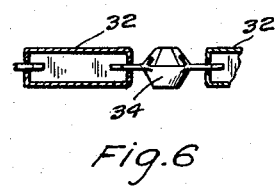
Fig. 6 is a section on the line 6—6 of Fig. 5.
Figure 7:
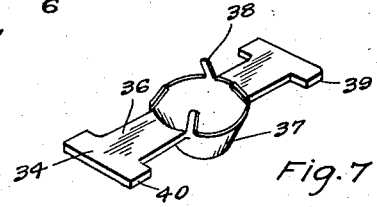
Fig. 7 is an enlarged perspective view of the link connecting element for the chain of Fig. 5.

A modified chain construction 32 is illustrated in Fig. 5, and consists of hollow box-type links 33 similarly formed as referred to above in reference to the links of Fig. 1, connecting elements 34 and end catch parts 35. The connecting element 34 has a web 36 with an integral centrally positioned stone holding cup 37, which may be of any shape or size and which has prongs 38 for holding a rhinestone or the like within the cup, the web having lateral end key portions 39, 40. As assembled, the element 34 has its keys 39, 40 locked within the adjoining links as illustrated in Fig. 6 in the manner shown in Fig. 12, and the stone holding cup is centered between the adjoining links whereby a flexible chain of box type links with alternating stones therebetween is provided.

It is now clear that my novel construction and method of manufacture provides a chain which is simple to form and assemble and which has links secured by independent connecting elements which flexibly hold the chain together in alignment, with the end tabs of each link cooperating with the lateral parts and side recesses of the connecting elements to fixedly bind the chain together and prevent separation thereof.

Although I have disclosed a specific embodiment of my invention, it is obvious that changes in the size, shape, and arrangement of the parts may be made to meet certain other requirements, without departing from the spirit and the scope of the invention as defined in the appended claims.

I claim:

1. In an ornamental chain, a series of hollow links, a connecting element disposed between pairs of said links and operatively secured thereto, said links and connecting elements defining a flexible chainlink construction, each of said links being formed from a one-piece blank and including a base, side members joined to said base and wing members joined to said side members, said wing members being folded over into contact relation and being positioned in parallel relation with respect to said base, thereby defining the bottom of said link, said base, side members and wing members having tabs formed on each end thereof and disposed in perpendicular relation thereto, said tabs being tapered to nest together and defining a slot therebetween, said connecting elements extending through said slots in said links and locked therein.

2. In an ornamental chain as set forth in claim 1, wherein said connecting elements are formed of flat stock and are defined by a transverse web and lateral end portions, side recesses being formed between said web and end portions, said lateral end portions being locked behind said tabs.

References Cited in the file of this patent

UNITED STATES PATENTS

| | | |
|---|---|---|
| 190,094 | Sone | Apr. 24, 1877 |
| 311,722 | Cottle | Feb. 3, 1885 |
| 1,130,253 | Bradley | Mar. 2, 1915 |
| 1,304,706 | Pruefer | May 27, 1919 |
| 1,649,108 | Gebhardt | Nov. 15, 1927 |
| 1,787,405 | Dansereau | Dec. 30, 1930 |
| 1,818,858 | McAlees | Aug. 11, 1931 |
| 2,257,579 | Starr | Sept. 30, 1941 |

FOREIGN PATENTS

| | | |
|---|---|---|
| 11,294 | Great Britain | May 14, 1913 |